United States Patent [19]

Wood

[11] 4,292,412
[45] Sep. 29, 1981

[54] HYDROPHILIC, FABRIC SOFTENER FOAM COMPOSITIONS AND METHOD OF MAKING

[75] Inventor: Louis L. Wood, Rockville, Md.

[73] Assignee: W. R. Grace & Co., New York, N.Y.

[21] Appl. No.: 112,575

[22] Filed: Jan. 16, 1980

[51] Int. Cl.³ .................... C08G 18/14; C08G 18/10; C08G 18/32; C08G 18/38
[52] U.S. Cl. .................................. 521/107; 521/108; 521/116; 521/121; 521/125; 521/128; 521/159; 521/905; 252/8.8
[58] Field of Search ................. 252/8.8; 521/107, 108, 521/116, 121, 125, 128, 159, 905

[56] References Cited

U.S. PATENT DOCUMENTS

| | | | |
|---|---|---|---|
| 3,903,232 | 9/1975 | Wood et al. | 264/157 |
| 4,110,498 | 8/1978 | Benjamin et al. | 252/8.8 |
| 4,129,694 | 12/1978 | Cogliann et al. | 521/107 |
| 4,137,200 | 1/1979 | Wood et al. | 521/159 |
| 4,156,592 | 5/1979 | Wood | 428/311 |
| 4,193,887 | 3/1980 | Stone et al. | 521/905 |

FOREIGN PATENT DOCUMENTS 758642  5/1967  Canada ............................. 521/128

Primary Examiner—Joseph L. Schofer
Assistant Examiner—Maria Parish Tungol
Attorney, Agent, or Firm—Richard P. Plunkett; William W. McDowell, Jr.

[57] ABSTRACT

This invention relates to new, hydrophilic, fabric softener foam compositions having improved release ability of the fabric softener abetted by the addition of a hydrophilic polyether polyol release agent to the aqueous reactant containing the fabric softener prior to reacting the aqueous reactant with a hydrophilic, isocyanate-terminated prepolymer to form the foam.

5 Claims, No Drawings

HYDROPHILIC, FABRIC SOFTENER FOAM COMPOSITIONS AND METHOD OF MAKING

FIELD OF THE INVENTION

This invention relates to new, hydrophilic, fabric softener foam compositions having improved release ability of the fabric softener.

Numerous attempts have been made in the prior art seeking solutions to improving fabric softening.

Certain chemical compounds have been known in the art to possess the desired quality of imparting softness to textile fabrics. The quality of softness is well defined in the art and means that a treated fabric is smooth, pliable and fluffy.

Additionally, many of these compounds act to reduce static cling of the treated fabrics. Static cling is generally the phenomenon of fabric adhering as a result of static electrical charges located in the surface of the fabric. By softening and reducing the static cling of a fabric, it is more comfortable when worn. Such treated fabrics additionally are easier to iron and have fewer hard-to-iron wrinkles.

By the present invention, fabric softening polyurethane foam is prepared by reacting a prepolymer comprising a particular isocyanate-capped polyoxyethylene polyol with large amounts of an aqueous reactant in the presence of a fabric softener and release agent. The thus generated polyurethane foam having fabric softener and release agent uniformly disposed throughout is found to have improved fabric softening and static electricity eliminating features.

DESCRIPTION OF PRIOR ART

It is known from U.S. Pat. No. 4,137,200, incorporated herein by reference in its entirety, to make hydrophilic polyurethane by reacting an isocyanate-terminated prepolymer formed from a hydrophilic polyether polyol, e.g., polyoxyethylene polyol and a polyisocyanate, and with a water reactant.

It is also known from U.S. Pat. No. 4,129,694 to make fabric softening polyurethane foam by reacting an isocynate-capped polyoxyethylene polyol with large amounts of an aqueous reactant in the presence of a fabric softener. Generally, large amounts in excess of 200% by weight of the dry foam of the softening agent are required.

It is also known from U.S. Pat. No. 4,156,592 to incorporate a fabric softener into reticulated urethane foam. The fabric softener therein acts as a solid binder which maintains the reticulated urethane foam in a compressed sheet-like form. The thus compressed foam can be advantageously packaged, shipped and displayed economically, and on use in a laundry wash cycle the fabric softener is released allowing the foam to slowly rebound to substantially its original uncompressed shape.

In both the aforestated fabric softener-containing foams the drawback has been the poor release ability of the fabric softener in the wash cycle. That is, in some instances the fabric softener-containing foams have been recycled through a washing machine 5 times and only 15% by weight of the fabric softener present has escaped from the foam. This results in failure to impart softness efficiently and economically to textile fabrics and to reduce static cling.

OBJECT OF THE INVENTION

One object of the instant invention is to produce a hydrophilic, fabric softener foam composition having improved release ability of the fabric softener. Another object of the instant invention is to produce a hydrophilic, fabric softener foam composition having good release ability of the fabric softener wherein the foam can be either open cell or reticulated. Yet another object of the instant invention is to produce a hydrophilic, fabric softener-containing foam which can be compressed prior to use and which thereafter on contact with water in a wash cycle will expand, thereby allowing the fabric softener to be released from the foam readily.

This and other objects which will become apparent from a reading hereinafter are obtained from a composition comprising (a) a water reactant; (b) a prepolymer comprising at least one isocyanate-capped polyol having a reaction functionality of at least two, the total of said polyol present having an ethylene oxide content of at least 40 weight percent before capping; (c) when the reaction functionality of (b) is two, a crosslinking agent containing at least 3 functional groups; (d) a hydrophilic polyether polyol release agent and (e) a fabric softener, the weight ratio of (a):(b) being 0.3 to 2.0:1.0.

Various combinations of (b), per se, or with (c) supra are operable to form the hydrophilic, isocyanate-terminated prepolymers operable in the present invention. One example to form (b) supra would be to cap a polyoxyethylene containing diol with a diisocyanate such that the capped product had a reaction functionality of 2. Since this material, per se, will not yield a crosslinked foam on addition of a water reactant, it is necessary to add thereto either (1) a diol capped with a polyisocyanate having a functionality greater than two, e.g., benzene-1,3,5-triisocyanate;

(2) a polyol containing at least 3 OH groups capped with a di- or polyisocyanate;

(3) an isocyanate-reactive crosslinking agent such as one having from 3 up to 6 or more reactive amine, thiol or carboxylate sites per average molecule which is added to the water reactant or (4) a combination of (1) and (2).

Other examples of (b) operable herein to form foams would be (1) or (2) supra, per se, or blended together with or without (3).

When two or more isocyanate-capped polyols are blended to form (b), the ethylene oxide present in the polyol or blend of polyols can be present in only one polyol, some of the polyols or in each polyol as long as the amount is equal to at least 40 weight percent of the polyols present before capping with the di- or polyisocyanate.

The polyurethane foam used herein is made by the prepolymer method using a large excess of water in accord with the method set out in U.S. Pat. No. 4,137,200, incorporated in its entirety herein by reference.

The present crosslinked, hydrophilic fabric softener foams may be prepared from a prepolymer formed by capping polyoxyethylene polyol with a polyisocyanate such that the capped prepolymer has a reaction functionality greater than two. The capped prepolymer is then formed into foam simply by being added to and reacting with an aqueous reactant containing the fabric softener and the hydrophilic polyether polyol release agent. Optionally, the capped product and/or aqueous reactant may contain a suitable crosslinking agent, if desired, in which case the capped polyoxyethylene polyol product may have a functionality approximating two.

During capping it is desirable that polyisocyanate be reacted with the polyol such that the reaction product, i. e., the capped product, is substantially void of reactive hydroxy groups while containing more than two reactive isocyanate sites per average molecule.

Another route for achieving this desired result is to react, during the foaming reaction, an isocyanate-capped diol having two reactive isocyanate sites per average molecule, in a reaction system containing a polyfunctional reactive component, such as one having from three up to six or more reactive amine, thiol or carboxylate sites per average molecule. These latter sites are highly reactive with the two reactive isocyanate sites.

Polyoxyethylene polyol used as a reactant in preparing the isocyanate-capped prepolymer may have a weight average molecular weight of about 200 to about 20,000, and preferably between about 600 to about 6,000, with a hydroxyl functionality of about two or greater, preferably from about 2 to about 8.

Polyoxyethylene polyol is terminated or capped by reaction with a polyisocyanate. The reaction is preferably carried out in an inert moisture-free atmosphere such as under a nitrogen blanket, at atmospheric pressure at a temperature in the range of from about 0° C. to about 120° C. for a period of time of up to about 80 hours depending upon the temperature and degree of agitation. This reaction may be effected also under atmospheric conditions provided the product is not exposed to excess moisture. The polyisocyanates used for capping the polyoxyethylene polyol include PAPI (a polyaryl polymethylene-polyisocyanate as defined in U.S. Pat. No. 2,683,730), tolylene diisocyanate, triphenylmethane-4,4',4''-triisocyanate, benzene-1,3,5-triisocyanate, toluene-2,4,6-triisocyanate, diphenyl-2,4,4'-triisocyanate, hexamethylene diisocyanate, xylene diisocyanate, chlorophenylene diisocyanate, diphenylmethane-4,4'-diisocyanate, naphthalene-1,5-diisocyanate, xylene-alpha, 3,3'-dimethyl-4,4'-biphenylene diisocyanate, 3,3'-dimethoxy-4,4'-biphenylene diisocyanate, 2,2',5,5'-tetramethyl-4,4'-biphenylene diisocyanate, 4,4'-methylene bis(phenylisocyanate), 4,4'-sulfonyl bis(phenyl-isocyanate), 4,4'-methylene di-orthotolylisocyanate, ethylene diisocyanate, trimethylene diisocyanate, diicyclohexyl methane-4,4'-diisocyanate, isophorone diisocyanate, 1,6-hexa-methylene diisocyanate, 2,2,4-trimethyl-1,6-hexane diisocyanate and the like. Mixtures of any one or more of the above mentioned organic isocyanates may be used as desired. The aromatic diisocyanates, aliphatic and cycloaliphatic diisocyanates and polyisocyanates or mixtures thereof which are especially suitable are those which are readily commercially available, have a high degree of reactivity and a relatively low cost.

Capping of the polyoxyethylene polyol may be effected using stoichiometric amounts of reactants. Desirably, however, an excess of polyisocyanate is used to insure complete capping of the polyol. Thus, the ratio of isocyanate groups to the hydroxyl groups used for capping is between about 1 to about 4 isocyanates per hydroxyl, preferably 1.8 to 3.0 isocyanate groups per hydroxyl.

Isocyanate-capped polyoxyethylene polyol reaction products (prepolymers) employed in the present invention may be exemplified as follows. First, when water is the sole reactant with the isocyanate groups of the prepolymer during the foaming process, the isocyanate-capped polyoxyethylene polyol reaction product must have an average isocyanate functionality greater than two and up to about eight or more depending upon the composition of the polyol and capping agent components. Secondly, when the isocyanate-capped polyoxyethylene polyol has an isocyanate functionality of only about two, then the water or aqueous reactant used may contain a dissolved or dispersed isocyanate-reactive crosslinking agent having an effective functionality greater than two. In this latter case, the reactive crosslinking agent is reacted with the capped polyoxyethylene polyol during the foaming process.

Conventional water soluble or water dispersible isocyanate-reactive crosslinking agents having an active functionality greater than two include those containing amine, thiol and carboxylate groups. Examples of such crosslinking agents include, but are not limited to, ethylene diamine, diethylene triamine, n-methyl ethylene diamine, cyclopentane-tetracarboxylic acid, 1,3,5-benzene tricarboxylic acid, citric acid, trimethylolpropane tris($\beta$-mercaptopropionate) and pentaerythritol tetrakis($\beta$-mercaptopropionate), triethylenetetramine, tetra-ethylenepentamine, polyethyleneimine, tolylene-2,4,6-triamine, trimethylenediamine, tetramethylenediamine, pentamethylenediamine, hexamethylene-diamine, ethanolamine, diethanolamine, hydrzine, triethanolamine, benzene-1,2,4-tricarboxylic acid, nitrilotriacetic acid and 4,4'-methylenebis(o-chloroaniline).

Thirdly, when the isocyanate-capped polyoxyethylene polyol has an isocyanate functionality of only about two, then a polyisocyanate crosslinking agent having an isocyanate functionality greater than two may be incorporated therein, either preformed or formed in situ, and the resultant mixture is reacted with water or aqueous reactant containing the fabric softener and release agent and optionally containing a dissolved or dispersed reactive isocyanate-reactive crosslinking agent, leading to a crosslinked, hydrophilic polyurethane foam.

Several different modes may be used to prepare the prepolymer, i.e., the hydrophilic capped polyoxyethylene polyol reaction product having an average isocyanate functionality greater than two. In forming the prepolymer, blends or mixtures of the various polyols and/or polyisocyanates may be used as desired so long as the total average isocyanate functionality of the final urethane containing reaction product is greater than two and the ethylene oxide content of the polyol is at least 40 weight percent prior to capping.

One useful mode is to polymerize ethylene oxide in the presence of a polyfunctional hydroxyl containing starter component, such as glycerol, trimethylolpropane or trimethylolethane, which leads to polyoxyethylene triols. The molecular weight of these polymeric triols may be varied greatly, depending on the number of moles of ethylene oxide used in the reaction with the starter component. Starter components such as pentaerythritol and sucrose likewise treated with ethylene oxide lead to polymeric polyoxyethylene tetrols and hexols, respectively. Alternatively, polyols suitable for capping with polyisocyanate may be prepared from diols, triols, tetrols, hexols and polycarboxylic acids.

A second possible method for preparing the prepolymer is by reacting polyoxyethylene glycol having a reactive functionality equal to two with a molar excess of a diisocyanate which leads to an isocyanate-capped polyurethane product (A) having an isocyanate functionality of two. A polyol such as pentaerythritol having a reactive functionality equal to four is reacted with a large molar excess of a diisocyanate to form an isocyanate-capped polyurethane intermediate product (B) having an isocyanate functionality of four. By blending the two isocyanate-capped products thus prepared, i.e., products (A) and (B), in various molar proportions, the resulting product mixture has an average isocyanate functionality greater than two and on admixture with aqueous reactants will lead to the hydrophilic crosslinked polyurethane foams of the present invention. In addition, other monomeric or polymeric polyisocyanate crosslinking agents may be substituted for the tetraisocyanate product (B). Tolylene-2,4,6-triisocyanate having a reactive functionality of three is an example of a simple monomeric triisocyanate which may be usefully employed to achieve the same objective of imparting to the system an average isocyanate functionality greater than two.

A third method for preparing the prepolymer is to blend a generally linear diol or polyol with a polyol having at least 3 and preferably from 3 to 8 hydroxyl groups (e.g., trimethylol-propane, trimethylolethane, glycerol, pentaerythritol or sucrose). Generally, monomeric polyols having 3 or 4 hydroxyl groups per mole are employed. The blend is then reacted with a sufficient amount of a polyisocyanate so that the resulting prepolymer is substantially void of unreacted hydroxyl groups, i.e., an excess of the polyisocyanate is preferably employed. The excess of polyisocyanate can range up to the point where about 4 isocyanate groups are employed for each hydroxyl group.

A fourth method would be to blend any combination of the prepolymer described in the first method with the constituents described in the second or third method either individually or collectively.

It has also been found that the capped polyoxyethylene polyol having an isocyanate functionality greater than two used to prepare a three-dimensional network polymer must be present in an amount sufficient to insure formation of the three-dimensional network. Thus, amounts of the capped polyoxyethylene polyol having an isocyanate functionality greater than two in the component to be formed into foam ranging from about 3% by weight of this component up to 100% by weight. Hence, it is possible to include an isocyanate capped diol having an isocyanate functionality of two, e.g., polyethylene glycol capped with toluene diisocyanate in an amount from 0% by weight up to about 97% by weight of the component to be formed into foam. The maximum amounts of diisocyanate used are limited to that necessary to permit crosslinking to take place during the particle forming reaction, as contrasted to formation of a linear polymeric structure.

The polyoxyethylene polyols used to form prepolymer in this invention are water-soluble reaction products derived fom the polymerization of ethylene oxide in the presence of a polyfunctional starter compound such as water, ethylene glycol, glycerol, pentaerythritol, sucrose and the like. The molecular weights may be varied over a wide range by adjusting the relative ratios of ethylene oxide monomer to starter compound. The operable molecular weight ranges have been described previously.

It is possible and sometimes desirable to incorporate various amounts of a relatively hydrophobic comonomer into the ethylene oxide based polymerization products used to form the hydrophilic prepolymer. Thus, comonomers such as propylene oxide or butylene oxide may be copolymerized as a random copolymer, blockcopolymer or both, such that the copolymers remain hydrophilic while having other desirable features for certain applications, namely, improved low temperature flexibility and hydrolytic stability. Up to about 40–60 weight percent, but desirably about 25–45 weight percent of the relatively hydrophobic comonomer, may be copolymerized with the ethylene oxide monomer and still yield hydrophilic crosslinked solid polyurethane foams when those products are used as polyol intermediates in practicing the present invention. Thus, throughout the text of this document, the term "polyoxyethylene polyol" is intended to include not only homopolymers of ethylene oxide but also hydrophilic copolymers of ethylene oxide such as those described above wherein all of these polyol derivatives have a hydroxyl functionality of about two or greater and an ethylene oxide content ranging from about 40 weight percent to about 100 weight percent and preferably greater than about 55 weight percent.

To effect foam formation with a crosslinked network, the prepolymer is simply added to and reacted with a particular aqueous component. For simplicity, this isocyanate-capped prepolymer will occasionally be referred to herein as "resin reactant".

The aqueous component may be water, a water slurry or suspension, a water emulsion or a water solution having water soluble materials disposed therein. For convenience, the aqueous component is referred to herein as an aqueous reactant.

In contrast to typical polyurethane reactions such as those using catalyst or like promoters where one mole of -NCO is reacted with one half mole water, the present reaction proceeds simply with large excesses of water.

Because larger amounts of water are in the aqueous reactant during reaction, i.e., the present invention is not dependent upon a stoichiometric molar NCO-water type reaction, it is possible to combine a great variety of materials in the aqueous reactant which are otherwise not possible with limited water reacting systems.

The aqueous reactant may be used at temperatures from slightly above 0° C. to about 100° C. as desired. This temperature can be readily determined and can be modified by the use of catalysts in the aqueous phase. It is possible also to effect reaction of the resin reactant in the water-soluble solvent using water vapor or steam as the aqueous component.

In contrast to typical polyurethane reaction such as those using catalyst or like promoters where one mole of -NCO is reacted with one-half mole water, the present reaction proceeds simply with a large but controlled excess of water.

In typical polyurethane reactions known to the art, it is known to employ an excess of water in prepolymer foaming formulations to obtain improved properties. It is further known that, if less than stoichiometric amounts of water are used, the foam is more crosslinked, firmer, has lower elongation and higher density. It is commonly taught in the prior art that a large excess of water will use up the free isocyanate groups, leaving insufficient isocyanate available for effective crosslinking and resulting in the formation of many free amino end groups. As water content increases, the foam density decreases and above 30-50% excess water over stoichiometry results in a marked decrease in physical properties.

The dramatic way in which the addition of water influences practice of the present invention is seen by consideration of the Water Index Value defined as equivalents of $H_2O \times 100$ divided by equivalents of NCO. In polyurethane foaming reactions one mole of water ultimately consumes 2 NCO groups, i.e., 1.0 mole $H_2O = 2$ equivalents -OH which react with 2 equivalents of NCO. A Water Index Value of 100 indicates the equivalents of water and equivalents of isocyanate are balanced. An Index of 95 indicates that there is a 5% shortage of water equivalents while an Index of 105 indicates a 5% surplus of water equivalents. A slight shortage of water equivalents (i.e., a slight excess of isocyanate), usually 3-5%, is common practice in the prior art, particularly with flexible foams.

Using the present resin reactant and water in amounts from about 0.5 mole $H_2O$/mole NCO groups ($H_2O$ Index Value of 100) up to about 2 moles $H_2O$/mole NCO groups ($H_2O$ Index Value of 400) results in poor foaming unless materials such as surfactants and catalysts or the like are included. Amounts up to about 2 moles $H_2O$/mole NCO ($H_2O$ Index Value of 400) require a catalyst. When using about 6.5 moles $H_2O$ mole/NCO groups ($H_2O$ Index Value of 1,300) up to about 390 moles $H_2O$/mole NCO groups, ($H_2O$ Index Value 78,000), surprisingly good foams result which improve in characteristics with added amounts of molar water. Thus, the available water content in the aqueous reactant is from about 6.5 to about 390 moles $H_2O$/NCO groups in the resin reactant, i.e., an $H_2O$ Index Value of about 1,300 to about 78,000 and desirably from about 4,000 to about 40,000, i.e., about 20 to about 200 moles $H_2O$/NCO groups.

"Available water" in the aqueous reactant is that water accessible for reaction with the resin reactant and which is exclusive of water which may layer during reaction or supplemental water which may be necessary because of further water-absorbtive or water-binding components or additives present in and forming the aqueous reactant.

The use of large molar excesses of water in the aqueous reactant leads to several important advantages and improvements over the conventional polyurethane foam compositions. For example, in conventional polyurethane foam compositions, the water concentration must be carefully controlled to near the theoretical amount, usually an amount much less than about an $H_2O$ Index Value of 400 (2.0 moles $H_2O$/NCO groups in the polyurethane reaction components) and the fabric softeners must be separately included. This low concentration dictates the use of a catalyst to promote the rate of the polymerization foaming reaction and requires an intensive mixing step to achieve good mixing of reactants and catalyst so as to insure a controllable and uniform cellular product, other additives are avoided. In contrast, the present polyurethane foam requires very large but controlled excess of water, e.g., typically about an $H_2O$ Index Value of about 1,300 to about 78,000. Using this technique, the product quality and uniformity is not highly sensitive to accuracy of metering or mixing of the aqueous reactant and the use of a polymerization catalyst or promoter is optional. Thus, the fabric softener and release agent are included in the polyurethane structure at the time of foaming.

The hydrophilic foams of the present invention may be formulated so as to be flexible, semi-rigid or rigid in nature and to be of primarily open cell or reticulated structure as desired.

Fabric softeners can be used singly or in admixture with compatible fabric softeners. The fabric softeners which contain at least one long chain group includes cationic quaternary ammonium salts including quaternary imidazolinium salts; non-ionic compounds, such as tertiary phosphine oxides, tertiary amine oxides and ethoxylated alcohols and alkylphenols; anionic soaps, sulfates and sulfonates, e.g., fatty acid soaps, ethoxylated alcohol sulfates and sodium alkyl sulfates, alkyl sulfonates, sodium alkylbenzene sulfonates and sodium or potassium alkylglyceryl-etheresulfonates; Zwitterionic quaternary ammonium compounds; ampholytic tertiary ammonium compounds and compatible mixtures of one or more compounds of these classes.

Because of their known softening efficacy, the most preferred cationic softening agents are dialkyl dimethyl ammonium chloride or alkyl trimethyl ammonium chloride wherein the alkyl contains from 12 to 20 carbon atoms and are derived from long chain fatty acids, especially from hydrogenated tallow. The tallow and tallowalkyl are intended to mean alkyls containing from 16 to 18 carbon atoms. Specific examples of the particularly preferred cationic softening agents include tallowtrimethyl ammonium chloride, tallowdimethyl (3-tallowalkoxypropyl) ammonium chloride, ditallow dimethyl ammonium chloride, ditallow dimethyl ammonium methyl sulfate, eicosyltrimethyl ammonium chloride, and dieicosyldimethyl ammonium chloride.

Examples of other preferred cationic softening agents suitable for use in the invention herein include dodecyltrimethyl ammonium chloride, didodecyldimethyl ammonium chloride, tetradecyltrimethyl ammonium chloride, ditetradecyldimethyl ammonium chloride, pentadecyltrimethyl ammonium chloride, dipentadecyldimethyl ammonium chloride, didodecyldiethyl ammonium chloride, didodecyldipropyl ammonium chloride, ditetradecyldiethyl ammonium chloride ditetradecyldipropyl ammonium chloride, ditallowdiethyl ammonium chloride, ditallowdipropyl ammonium chloride, tallowdimethyl benzyl ammonium chloride, tallowdiethyl benzyl ammonium chloride, dodecyltrimethyl ammonium methyl sulfate, didodecyldiethyl ammonium acetate tallowtrimethyl ammonium acetate, tallowdimethyl benzyl ammonium nitrite, and ditallowdipropyl ammonium phosphate.

Cationic quaternary imidazolinium compounds are also preferred as softening agents. These compounds conform to the formula

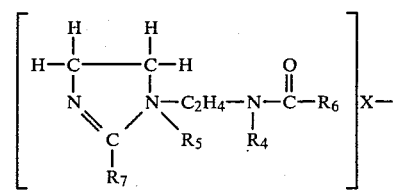

wherein $R_5$ is an alkyl containing from 1 to 4, preferably from 1 to 2, carbon atoms, $R_6$ is an alkyl containing from 1 to 4 carbon atoms or a hydrogen radical, $R_7$ is an alkyl containing g from 8 to 25, preferably at least 15 carbon atoms, $R_4$ is hydrogen or an alkyl containing from 8 to 25 preferably at least 15, carbon atoms, and X is an anion, preferably menthyl sulfate or chloride ions. Particularly preferred are those compounds in which both $R_4$ and $R_7$ are alkyls of from 16 to 25, especially 16 to 18 and 20 to 22, carbon atoms.

Many other cationic quaternary ammonium softening agents, which are useful herein, are known; for example, alkyl [$C_{12}$ to $C_{20}$]—pyridinium chlorides, alkyl [$C_{12}$ to $C_{20}$]-alkyl [$C_1$ to $C_3$]-morpholinium chlorides, and quaternary derivatives of amino acids and amino esters.

Other preferred softening agents include Zwitterionic quaternary ammonium compounds which have the formula

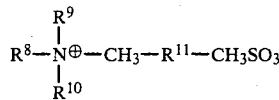

wherein $R_9$ and $R_{10}$ are each methyl, ethyl, n-propyl, iso-propyl, 2-hydroxyethyl or 2-hydroxypropyl, $R_8$ is 20 to 30 carbon atom alkyl or alkenyl and wherein said alkyl or alkenyl contains from 0 to 2 hydroxyl substitutnts, from 0 to 5 ether linkages, and from 0 to 1 amide linkage, and $R_{11}$ is an alkylene group containing from 1 to 4 carbon atoms with from 0 to 1 kydroxyl substituents; particularly preferred are compounds wherein $R_8$ is a carbon chain containing from 20 to 26 carbon atoms selected from the group consisting of alkyls and alkenyls and wherein said alkyls and alkenyls contain 0 to 2 hydroxyl substituents. Specific examples of the particularly preferred compounds of this class include 3-N-eicosyl-N,N-dimethylammonio)-2-hydroxypropane-1-sulfonate, 3-(N-eicosyl-N,N-dimethylammonio)-propane-1-sulfonate, 3-[N-eicosyl-N,N-di(2-hydroxyethyl) ammonio]-2-hydroxypropane-1-sulfonate 3-(N-docosyl-N,N-dimethylammonio)-2-hydroxypropane-1-sulfonate, 3-(N-docosyl-N,N-dimethylammonio)-propane-1-sulfonate, 3-[N-docosyl-N,N-bis-(2-hydroxyethyl)ammonio]2-hydroxypropane-1-lsulfonate, 3-(N-tetracosyl-N,N-dimethylammonio)-2-hydroxypropane-1-sulfonate, 3-(N-tetracosyl-N,N-dimethylammonio)-propane-1-sulfonate, 3-[N-tetracosyl-N,N-bis-(2-hydroxyethyl) ammonio)-2-hydroxypropane-1-sulfonate, 3-[N-tetracosyl-N,N-bis-(2-hydroxyethyl) ammonio]-2-hydroxypropane-1-sulfonate, 3-(N-hexacosyl-N,N-dimethylammonio)-2-hydroxypropane-1-sulfonate, 3-(N-hexacosyl-N,N-dimethyl-ammonio)-propane-1-sulfonate.

Examples of other preferred compounds of this case are 3-(N-eicosyl-N-ethyl-N-methylammonio)-2-hydroxypropane-1-sulfonate, 3-N-docosyl-N-ethyl-N-methylammonio)-2-hydroxypropane-1-sulfonate, 3-(N-tetracosyl-N-ethyl-N-methylammonio)-2-hydroxypropane-1-sulfonate, 3-(N-heneicosyl-N,N-dimethylammonio)-2-hydroxypropane-1-sulfonate, 3-(N-tricosyl-N,N-dimethylammonio)-2-hydroxypropane-1-sulfonate, 3-(N-tricosyl-N-ethyl-N-methylammonio)-2-hydroxypropane-1-sulfonate, 3-(N-tricosyl-N,N-dimethylammonio)-propane-1-sulfonate, 3-(N-pentacosyl-N,N-dimethyl ammonio)-2-hydroxypropane-1-sulfonate, 3-[N-(2-methoxydocosyl)-N,N-dimethylammonio]-2-hydroxypropane-1-sulfonate, 3-(N-heptacosyl-N,N-dimethylammonio)propane-1-sulfonate, 3-(N-ocatacosyl-N,N-dimethylammonio)-2-hydroxypropane-1-sulfonate, 3-N-noncosyl-N,N-dimethylammonio)-2-hydroxypropane-1-sulfonate, 3-(N-1-triacontyl-N,N-dimethylammonio)propane-1-sulfonate, 3-[N-(3,5-dioxatetracosyl)-N,N-dimethylammonio]-2-hydroxy propane-1-sulfonate.

Other Zwitterionic known compounds include Zwitterionic synthetic detergents as represented by derivatives of aliphatic quaternary ammonium compounds wherein one of the four aliphatic groups has about 8 to 20 carbon atoms, another contains a water-solubilizing group such as carboxy, sulfato or sulfo groups any of which are straight or branched.

Nonionic tertiary phosphine oxide compounds have the generic formula:

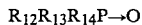

wherein $R_{12}$ is alkyl, alkenyl, or monohydroxy alkyl having a chain length of from 20 to 30 carbon atoms, and wherein $R_{13}$ and $R_{14}$ are each alkyl or monohydroxyl alkyl containing from 1 to 4 carbon atoms; particularly preferred are tertiary phosphine oxides in which $R_{12}$ is alkyl, alkenyl and monohydroxy alkyl having a chain length of from 20 to 36 carbon atoms and wherein $R_{13}$ and $R_{14}$ are each menthyl, ethyl or ethanol.

Specific examples of particularly softeners of this class include eicosyldimethylphosphine oxide, eicosyldi (2-hydroxyethyl) phosphine oxide, docosyldimethylphosphine oxide, docosyldi(2-hydroxyethyl) phosphine oxide tetracosyldimethylphosphine oxide, hexacosyldimethylphosphine oxide, eicosyldiethylphosphine oxide, docosyldiethylphosphine oxide, and tetracosyldi(2-hydroxyethyl) phosphine oxide.

Examples of other tertiary phosphine oxides of this class include eicosylmethylethylphosphine oxide, heneicosyldimethylphosphine oxide, α-hydroxyeicosyldimethylphosphine oxide, β-hydroxydocosyldimethylphosphine oxide, heneicosylmethylethylphosphine oxide, docosylmethylethylphosphine oxide, tricosyldiethylphosphine oxide, tricosyldimethylphosphine oxide, tetracosyldi (2-hydroxyethyl) phosphine oxide, pentacosyldimethylphosphine oxide, eicosylmethyl-2-hydroxybutylphosphine oxide, eicosyldibutylphosphine oxide-docosylmethyl-3-hydroxybutylphosphine oxide, hexacosyldiethylphosphine oxide, heptacosyldimethylphosphine oxide, octacosyldiethylphosphine oxide, and triacontyldimethylphosphine oxide.

Other nonionic tertiary phosphine oxides useful herein include nonionic synthetic detergents having the same formula immediately above wherein $R_{12}$ is an alkyl, alkenyl, or monohydroxylalkyl of from 10 to 20 carbon atoms and wherein $R_{13}$ and $R_{14}$ are each alkyl or monohydroxyalkyl of from 1 to 3 carbon atoms.

Nonionic tertiary amine oxides can be utilized in the compositions of the present invention. These nonionic compounds have the formula

wherein $R_{15}$ represents a straight or branched chain alkyl or alkenyl containing from 20 to 30 carbon atoms and from 0 to 2 hydroxyl substituents, from 0 to 5 ether linkages, there being at least one moiety of at least 20 carbon atoms containing no ether linkages, and 0 to 1 amide linkage, and wherein $R_{16}$ and $R_{17}$ are each alkyl or monohydroxy alkyl groups containing from 1 to 4 carbon atoms and wherein $R_{16}$ and $R_{17}$ can be joined to form a heterocyclic group containing from 4 to 6 carbon atoms; particularly preferred are those wherein $R_{15}$ is a straight or branched alkyl, alkenyl, or monohydroxy alkyl containing 20 to 26 carbon atoms and wherein $R_{16}$ and $R_{17}$ are each methyl, ethyl or ethanol.

Specific examples of compounds of this class include eicocyl-bis-($\beta$-hydroxyethyl) amide oxide, eicosyldimethylamine oxide, docosyldimethylamine oxide, docosyl-bis-($\beta$-hydroxyethyl) amine oxide, tetracosyldimethylamine oxide, tetracosyl-bis-($\beta$-hydroxyethyl) amine oxide, hexacosyldimethylamine oxide, and hexacosyl-bis-($\beta$-hydroxytheyl) amine oxide.

Examples of other tertiary amine oxides of this class include 2-hydroxyeicosyldimethylamine oxide, eicosylmethylethylamine oxide, eicosyldiethylamine oxide, 2-hydroxyeicosyldiethylamine oxide, heneicosyldimethylamine oxide, heneicosyldiethylamine, oxide, docosyldiethylamine oxide, tricosyldimethylamine oxide, tricosylidiethylamine oxide, tetracosyldiethylamine oxide, $\beta$-hydroxytetracosyldimethylamine oxide, pentacosyldimethylamine oxide, hexacosyldiethylamine oxide, eicosylmethyl(2-hydroxypropyl) amine oxide, docosylbutylmethylamine oxide, 2-docosenyldimethylamine oxide, 2-methoxydocosyldimethylamine oxide, heptacosyldimethylamine oxide, octacosylmethylethylamine oxide, octacosyldiethylamine oxide, nonacosyldimethylamine oxide, triacontyldiethylamine oxide, 3,6-dioxaoctacosyldimethylamine oxide, 2-hydroxy-4-oxatetracosyldimethylamine oxide, 6-stearamidohexyldimethylamine oxide.

Other tertiary amine oxides useful herein are known and include compounds corresponding to the formula immediately above wherein $R_{15}$ is an alkyl of 8 to 20, particularly 16 to 18, carbon atoms, and $R_{16}$ and $R_{17}$ are methyl or ethyl radicals.

Nonionic ethoxylated alcohol compounds are also known softening agents and have the generic formula $$R_{18}\text{---}O(C_2H_4O)_xH$$

wherein $R_{18}$ represents an alkyl of from 20 to 30 carbon atoms, and X is an integer of from 3 to 45.

The preferred ethoxylated alcohol compounds of this class are condensation products of reacting from 3 moles to 45 moles of ethylene oxide with one mole of eicosyl alcohol, heneicosyl alcohol, tricosyl alcohol, tetracosyl alcohol, pentacosyl alcohol, or hexacosyl alcohol. Specific examples of the preferred ethoxylated alcohols include products of 3 moles ethylene oxide and 1 mole of heneicosyl alcohol; 9 moles ethylene oxide and 1 mole eicosyl alcohol; 12 moles ethylene oxide and 1 mole hexacosyl alcohol; 15 moles of ethylene oxide and 1 mole pentacosyl alcohol; and 30 moles of ethylene oxide and 1 mole tricosyl alcohol. Other ethoxylated alcohols are the condensation products of 3 moles to 45 moles of ethylene oxide with one mole of heptacosyl, octacosyl, nonacosyl, or triacontyl alcohols. Specific examples include 5 moles of ethylene oxide and 1 mole of nonacosyl alcohol; 6 moles of ethylene oxide and 1 mole of heptacosyl alcohol, 9 moles of ethylene oxide and 1 mole of octacosyl alcohol; 20 moles of ethylene oxide and 1 mole of heptacosyl alcohol; 30 moles of ethylene oxide and 1 mole of triacontyl alcohol; and 40 moles of ethylene oxide and 1 mole of nonacosyl alcohol.

Also suitable for use as softening agents are nonionic synthetic detergents as represented by the polyethylene oxide condensates of aliphatic alcohols containing from 8 to 20 carbon atoms and alkylphenois wherein the alkyl contains from 8 to 20 carbon atoms. Particularly preferred are the condensation products of 1 mole of tallow alcohol with 20 moles and with 30 moles of ethylene oxide.

Also preferred as softening agents are anionic ethoxylated alcohol sulfates and anionic sulfonates.

The preferred ethoxylated alcohol sulfates have the generic formula:

$$R_{19}\text{---}O(C_2H_4O)_xSO_3\text{-}M+$$

wherein X is an integer of from 1 to 20, M is an alkali metal (e.g., Na, K, Li), ammonium or substituted ammonium cations, and wherein $R_{19}$ is an alkyl containing from 20 to 30 carbon atoms.

The preferred anionic ethoxylated alcohol sulfate softening compounds are the sodium and potassium salts or the monoethanol, diethanol, or triethanol ammonium salts of the sulfated condensation product of from 1 to about 20 moles of ethylene oxide and one mole of eicosyl alcohol, heneicosyl alcohol, tricosyl alcohol, tetracosyl alcohol, pentacosyl alcohol, or hexacosyl alcohol. Specific examples of these particularly preferred anionic softening compounds include the salts of the sulfated condensation products of 1 mole of ethylene oxide and 1 mole of tetracosyl alcohol; 3 moles of ethylene oxide and 1 mole of hexacosyl alcohol; 9 moles of ethylene oxide and 1 mole of tricosyl alcohol; 12 moles of ethylene oxide and 1 mole of eicosyl alcohol; 16 moles of ethylene oxide and 1 mole of pentacosyl alcohol; and 29 moles of ethylene oxide and 1 mole of heneicosyl alcohol.

Other anionic ethoxylated sulfate compounds are sodium or potassium salts or monoethanol, diethanol, or triethanol ammonium cations of the sulfated condensation products of from 1 to 20 moles of ethylene oxide with one mole of heptacosyl alcohol, octacosyl alcohol, nonacosyl alcohol and triacontyl alcohol.

Anionic synthetic detergents are represented by alkyl sulfates of the formula:

$$R_{20}\text{---}OSO_3\text{---}M+$$

wherein M is an alkali metal and R is an alkyl of from 8 to 20 carbon atoms are also useful as softening agents herein.

The anionic sulfates have the general formula:

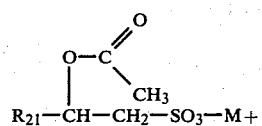

wherein M is an alkali metal or a substituted ammonium cation, and $R_{21}$ is an alkyl containing from 20 to 30 carbon atoms. The particularly preferred anionic sulfonates are those in which $R_{21}$ is an alkyl containing from 20 to 26 carbon atoms. Examples of the particularly preferred compounds include sodium or potassium 2-acetoxydocosylsulfonate, ammonium 2-acetoxydocosylsulfonate, diethanolammonium 2-acetoxydocosylsulfonate sodium or potassium 2-acetoxytricosylsulfonate, sodium or potassium 2-acetoxytetracosylsulfonate, sodium or potassium 2-acetoxypentacosylsulfonate, sodium or porassium 2 acetoxyhexacosylsulfonate, sodium or potassium 2 acetoxyheptacosylsulfonate and sodium or potassium 2-acetoxyoctacosylsulfonate.

Other anionic sulfonates include sodium or potassium 2-acetoxynonacosylsulfonate, 2-acetoxytriacontylsulfonate, 2-acetoxyheneitriacontylsulfonate, and 2-acetoxydotriacontysulfonate.

Other anionic sulfonates useful as softening agents are synthetic detergents of sodium or potassium alkylbenzenesulfonates and sodium alkyl-glycerylethersulfonates wherein the alkyl containing from 10 to 20 carbon atoms.

Additionally, ampholytic synthetic detergents of the formula:

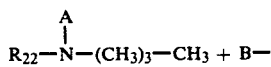

$$R_{22}-\overset{\overset{A}{|}}{N}-(CH_3)_3-CH_3 + B-$$

wherein $R_{22}$ is an alkyl of from 8 to 18 carbon atoms, A is $R_{22}$ or hydrogen and B is a water-solubilizing group (particularly $SO_3-$), can be used as softening agents.

Admixture of one or more softening agents can be used. Examples of Admixtures suitable for use herein include the following, wherein all percentages are by weight of the admixture:

| INGREDIENT | PERCENT |
|---|---|
| Ditallowdimethyl ammonium chloride | 65 |
| Tallowdimethylphosphine oxide | 35 |
| Eicosyltrimethyl ammonium chloride | 30 |
| Hexacosyldimethylamine oxide | 70 |
| Eicosyltrimethyl ammonium chloride | 60 |
| TAE$_{30}$ | 40 |
| Ditallowdimethyl ammonium chloride | 45 |
| 3-(N-eicosyl-N,N dimethylammonio)-2-hydroxy-propane-1-sulfonate | 55 |
| Ditallowdimethyl ammonium chloride | 60 |
| Eicosyldimethylamine oxide | 40 |
| Ditallowdimethyl ammonium chloride | 50 |
| 3-(N-eicosyl-N,N-dimethylammonio)-propane-1-sulfonate | 50 |
| Eicosyltrimethyl ammonium chloride | 50 |
| 3-(N-docosyl-N-ethyl-N-methylammonio)-2-hydroxy propane-sulfonate | 50 |
| Sulfated condensation product of 9 moles of ethylene oxide + mole of cicosyl alcohol | 50 |
| Condensation product of 9 moles of ethylene oxide 1 mole eicosyl alcohol | 50 |
| Sodium 2-acetoxydocosylsulfonate | 40 |
| TAE$_{20}$ | 60 |
| sodium 2-acetoxydocosylsulfonate | 60 |
| Tetracosyldimethylphosphine oxide | 40 |
| Diethanolammonium 2-acetoxydocosylsulfonate | 75 |
| Dodecyldimethylamine oxide | 25 |
| Dodecylbenzenesulfonate | 45 |
| TAE$_{20}$ | 55 |
| 3-(N-eicosyl-N,N-dimethylammonio)-2-hydroxypropropane-1-sulfonate | 70 |
| Condensation product of 30 moles of ethylene oxide + 1 mole tricosylalcohol | 30 |
| 3-(N-docosyl-N,N-dimethylammonio)-2-hydroxypropane-1-sulfonate | 65 |
| TAE$_{30}$ | 35 |
| 3-(N-tetracosyl-N,N-dimethylammonio)-2-hydroxy propane-1-sulfonate | 45 |
| Tetracosyldimethyl phosphine oxide | 55 |
| 3-(N-tetracosyl)-N,N-dimethylammonio)-2-hydroxypropane-1-sulfonate | 75 |
| Tallowdimethylamine oxide | 25 |

Anionic soaps, i.e., the sodium salts of long-chain fatty acids, such as lauric, myristic, palmitic, stearic and arachiodonic acids, can also be used as a softening agent herein and many such compounds are known in the art.

Other additives can also be used in combination with the softening agent. Although not essential, certain of these additives are particularly desirable and useful, such as perfumes and brightening agents; shrinkage controllers, anti-static agents and spotting agents are also useful.

Other additives can include anti-creasing agents, finishing agents, fumigants, lubricants, fungicides and sizing agents.

The amounts of additives that can be used in combination with a softening agent are generally small, being in the range of from 0.01% to 3% by weight of the softening agent.

Desirably, the fabric softener exhibits a softening point below a temperature of about 170° F., i.e., the temperature at which the fabric softener becomes sufficiently liquified to adhere to fabrics contacting the softener-impregnated polyurethane foam.

The hydrophilic polyether-containing polyol release agent is added to the water reactant along with the fabric softener prior to admixing the water reactant with the prepolymer. The release agent being water soluble or otherwise fluid or extractable during the wash cycle acts as a carrier for the fabric softener. Thus, in a wash or rinse cycle to which the fabric softener can be added, the release agent and fabric softener is removed from the foam uniformly by the wash or rinse water thereby imparting the requisite softness to the materials being washed therein. Operable hydrophilic polyether polyols release agents include polyoxyethylene polyol having molecular weights ranging from about 100 to 20,000 used to form prepolymers as defined herein and polyoxypropylene polyols having molecular weights ranging from 134 to 1,000.

The operable and preferred weight ranges of the components required to make the fabric softener foam of the instant invention are as follows:

| Component | Operable Range Parts by Weight | Preferred Range Parts by Weight |
|---|---|---|
| Hydrophilic isocyanate terminated prepolymer | 100 | 100 |
| Water reactant | 30–200 | 75–150 |
| Fabric softener | 10–200 | 25–100 |
| Hydrophilic polyether polyol release agent | 10–200 | 25–100 |

In addition to the above required components it is also possible, if desired, to add up to 5 parts per 100 parts of prepolymer of a surfactant, 0.1 to 5 parts of either a colorant or perfume per 100 parts of prepolymer and up to 10 parts per 100 parts of prepolymer of a blowing agent.

The following examples are set out to describe, but expressly not limit, the instant invention. Unless otherwise noted, all parts of percentages are by weight:

EXAMPLE 1

A prepolymer was prepared by admixing 2 molar equivalents of polyethylene glycol having an average molecular weight of 1,000 (PEG-1,000) and 0.66 molar equivalent of trimethylolpropane (TMOP). The admixture was dried at 100°–110° C. under a pressure of 5–15 Torr to remove water. The resulting dried mixture was slowly added over a period of about one hour to a vessel containing 5.50 molar equivalents of toluene diisocyanate (TDI) while stirring the TDI and polyol mixture. The temperature was maintained at 60° C. The mixture was maintained at 60° C. with stirring for three additional hours. The amount of TDI employed was about 92% of that theoretically required to cap all hydroxyl groups in the polyol mixture. All hydroxyl groups were capped with isocyanate and some chain-extension occurred between the polyols and TDI. The prepolymer will hereinafter be referred to as Prepolymer A.

EXAMPLE 2

80 g of Prepolymer A from Example 1 were charged to a quart container. To this was added with stirring 80 g of water containing 1 g of a surfactant sold under the tradename "PLURONIC P-75" by BASF Wyandotte, 80 g of commercially available polypropylene glycol having a molecular weight of 425 and 80 g of dimethyl distearyl ammonium chloride, a fabric softener sold under the tradename "AROSURF TA-100" by Ashland Chemical Co. The admixture was agitated for about 15 seconds using an electric drill fitting with a paint mixer disk at 25° C. After about 6 minutes, foaming was complete. The thus formed foam was dried at 70° C. in air for 48 hours. On inspection and analysis the dried foam had fine, open cells and a dry density of 14.8 pounds/ft$^3$.

To evaluate the performance of the fabric softener foam containing the release agent, an accurately weighed segment of the dry foam was placed in with a normal load of dirty clothes in a Maytag automatic washing machine set for permanent press, warm water and regular agitation. The resultant washed clothes exhibited the desired antistatic, soft qualities. Assuming that all the release agent was removed from the foam in the wash cycle, the weight percent of fabric softener removed $$= \frac{\text{Dry weight foam before wash} - \text{dry weight foam after wash} - \text{total weight release agent}}{\text{Original weight fabric softener}} \times 100$$

In the instant example the weight percent of the "TA-100" fabric softener removed was 56.7%.

In a controlled run wherein no release agent was added to the system, the percent of "TA-100" fabric softener removed was 30.5%.

EXAMPLE 3

Example 2 was repeated except that only 40 g of the fabric softener and 40 g of the release agent were added to the 80 g of water containing the 1 g of surfactant. A fine, open-celled foam having a dry density of 12.4 pounds/ft$^3$ resulted. The washed clothes had the desired antistatic, soft qualities and the weight percent of TA-100 fabric softener removed was 58.3%.

EXAMPLE 4

80 g of Prepolymer A from Example 1 were charged to a quart container. To this was added with stirring 80 g of water containing 1 g of a surfactant sold under the tradename "PLURONIC P-75" by BASF Wyandotte, 80 g of commercially available polyethylene glycol release agent having a molecular weight of 1,000 and 80 g of dimethyl distearyl ammonium chloride, a fabric softener sold under the tradename "AROSURF TA-100" by Ashland Chemical Co. The admixture was agitated for about 15 seconds using an electric drill fitting with a paint mixer disk at 25° C. After about 6 minutes, foaming was complete. The thus formed foam was dried at 70° C. in air for 48 hours. On inspection and analysis the dried foam had open cells and a dry density of 7.4 pounds/ft$^3$.

To evaluate the performance of the fabric softener foam containing the release agent, an accurately weighed segment of the dry foam was placed in with a normal load of dirty clothes in a Maytag automatic washing machine set for permanent press, warm water and regular agitation. The resultant washed clothes exhibited the desired antistatic, soft qualities. Assuming that all the water soluble release agent was removed from the foam in the wash cycle, the weight percent of fabric softener removed $$= \frac{\text{Dry weight foam before wash} - \text{dry weight foam after wash} - \text{total weight release agent}}{\text{Original weight fabric softener}} \times 100$$

In the instant example the weight percent of the "TA-100" fabric softener removed was 80.6%.

In a controlled run wherein no release agent was added to the system, the percent of "TA-100" fabric softener removed was 30.5%.

EXAMPLE 5

Example 46 repeated except that for evaluation a ½" slice of the dry foam was pressed at 20,000 psi for 30 seconds at 25° C. to give a 1/16" thick waxy sheet. Upon use in the wash cycle as in Example 4 the washed clothes had the desired antistatic, soft qualities and the amount of release agent removed from the foam in the wash cycle was 79.0%.

In this example the fabric softener functions also as a solid binder maintaining the foam in its compressed configuration. Upon immersion in water in the washing or rinsing cycle during laundering, the fabric softener is removed along with the release agent and dispersed, thereby allowing the foam to regain its original unpressed configuration. The water dispersibility of the fabric softener removes it as a binder and allows the foam to pop back to its original configuration, thereby rendering more fabric softener available than would be expected, e.g., 50–80% of the fabric softener is ordinarily released. The rebound of the compressed reticulated foam is desirable as it permits greater water flow through, thus releasing more fabric softener. This process takes place relatively slowly which may account for the fabric softening action in clothes even though the composition is administered at the beginning of the wash cycle.

The wafer or sheet-like products of the invention possess numerous advantages. A principal advantage is that the products are thin and easily packaged and stored, thereby offering considerable space-saving advantages over bulky liquids or powders which must be stored in boxes or other bulky containers. Another significant advantage is that the tendency of the foams to "pop" open or slowly return to their original uncompressed configuration also aids the release of fabric softener from the foam. Therefore, the resiliency of the foam upon release of the fabric softener binder in the machine wash environment is a very desirable feature in the foams. A further significant advantage is that the compressed foam products of the invention can be added at the beginning of the washing cycle as well as at the beginning of subsequent rinse steps. This unexpected ability of the foams to release the fabric softener while popping open to regain their original shape provides an unexpected convenience to the housewife. Conventional fabric softeners must be added either at the beginning of the rinsing step or during the drying cycle to avoid being washed from the clothes. Optimally, the sheet-like compositions of the invention will be added at the beginning of the rinse cycles although considerable effectiveness is achieved when the compositions are added at the beginning of the washing cycle. A further advantage is that the fabric softener is provided in a predetermined measured amount. The types of fabrics which can be conditioned with the compositions include all those normally employed with conventional fabric softeners, e.g., cotton, polyester, rayon, nylon, etc.

EXAMPLE 6

80 g of Prepolymer A from Example 1 were charged to a quart container. To this was added with stirring 80 g of water containing 40 g of commercially available polyethylene glycol release agent having a molecular weight of 1,000 and 40 g of a fabric softener sold under the tradename "TA-100" by Ashland Chemical Co. The admixture was agitated for about 15 seconds using an electric drill fitting with a paint mixer disk at 25° C. After about 6 minutes, foaming was complete. The thus formed foam was dried at 70° C. in air for 48 hours. On inspection, the dried foam had fine, open cells.

A $\frac{1}{2}$" slice of the dry foam was pressed at 20,000 psi for 30 seconds at 25° C. to give an $\frac{1}{8}$" thick waxy sheet. The dry foam sheet was placed in with a normal load of dirty clothes in a Maytag automatic washing machine set for permanent press, warm water and regular agitation. The resultant washed clothes exhibited the desired antistatic, soft qualities. Assuming that all the water soluble release agent was removed from the foam in the wash cycle, the weight percent of fabric softener removed in the instant example was 64.0%.

I claim:

1. A fabric softener-containing, urethane foam-forming composition comprising
  (a) a water reactant;
  (b) a prepolymer comprising at least one isocyanate-capped polyol having a reaction functionality of at least two, the total of said polyol present having an ethylene oxide content of at least 40 weight percent before capping;
  (c) when the reaction functionality of (b) is two, a crosslinking agent containing at least three functional groups;
  (d) a hydrophilic polyether polyol release agent and (e) a fabric softener, the weight ratio of (a):(b) being 0.3 to 2.0:1.0.

2. The composition of claim 1 wherein the release agent is polyethylene glycol having a molecular weight in the range 100–20,000.

3. The composition of claim 2 wherein the release agent has a molecular weight of 600–2,000.

4. The process of forming a hydrophilic polyurethane foam containing a fabric softener and release agent which comprises adding to a hydrophilic prepolymer comprising at least one isocyanate-capped polyol having a reaction functionality greater than two, the total of said polyol present having an ethylene oxide content of at least 40 weight percent before capping, a water reactant containing a fabric softener and a hydrophilic polyether polyol release agent, the weight ratio of the water reactant; prepolymer being 0.3 to 2.0:1.0.

5. A fabric softener-containing, urethane foam forming composition comprising
  (a) 50–200 parts of a water reactant;
  (b) 100 parts of a prepolymer comprising at least one isocyanate-capped polyol having a reaction functionality greater than two, the total of said polyol present having an ethylene oxide content of at least 40 weight percent before capping;
  (c) 10–200 parts of a hydrophilic polyether polyol release agent and
  (d) 10–200 parts of a fabric softener.

* * * * *